(12) United States Patent
Searcy

(10) Patent No.: US 11,668,080 B2
(45) Date of Patent: *Jun. 6, 2023

(54) WATER CONSERVING SHOWER SYSTEM AND THERMOCHROMIC FIXTURES USED THEREIN

(71) Applicant: AQUA VIEW INC., Temecula, CA (US)

(72) Inventor: Gus Searcy, Temecula, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/455,164

(22) Filed: Nov. 16, 2021

(65) Prior Publication Data

US 2022/0074176 A1 Mar. 10, 2022

Related U.S. Application Data

(62) Division of application No. 16/552,374, filed on Aug. 27, 2019, now Pat. No. 11,193,259, which is a (Continued)

(51) Int. Cl.
*E03C 1/04* (2006.01)
*B05B 1/30* (2006.01)
(Continued)

(52) U.S. Cl.
CPC .......... *E03C 1/0408* (2013.01); *B05B 1/3093* (2013.01); *E03B 7/045* (2013.01);
(Continued)

(58) Field of Classification Search
CPC .................................................... E03C 1/0408
(Continued)

(56) References Cited

U.S. PATENT DOCUMENTS

| 4,149,852 A | 4/1979 | Tiru et al. |
| 4,700,884 A | 10/1987 | Barrett |

(Continued)

FOREIGN PATENT DOCUMENTS

| CN | 201159334 Y | 12/2008 |
| CN | 101755093 A | 6/2010 |

(Continued)

OTHER PUBLICATIONS

International Search Report from Korean Intellectual Property Office dated Aug. 26, 2016 for related PCT Application No. PCT/US2016/033140.

(Continued)

*Primary Examiner* — Christine J Skubinna
(74) *Attorney, Agent, or Firm* — KOS IP Law LLP

(57) ABSTRACT

A water delivery system includes a mixing valve operable for delivering a water flow of adjustable temperature from a water source to a dispensing device downstream from the mixing valve; a thermochromic thermal indicator, fluidly coupled between the mixing valve and the dispensing device, that provides a visible indication of the water flow having achieved a predetermined temperature; and a diverter valve, fluidly coupled between the mixing valve and the dispensing device, and operable to direct the water flow selectively either to the dispensing device or back to the water source. The thermal indicator may be a thermochromic PVC conduit, or it may be a fitting having an inlet, an outlet, a thermochromic PVC element therebetween, and a barrier located between the inlet and the outlet so as to define a flow path that includes an interior surface of the thermochromic element.

16 Claims, 8 Drawing Sheets

Related U.S. Application Data division of application No. 14/937,587, filed on Nov. 10, 2015, now abandoned.

(51) Int. Cl.

| | | |
|---|---|---|
| *E03B 7/04* | (2006.01) | |
| *G01K 13/02* | (2021.01) | |
| *F16K 11/00* | (2006.01) | |
| *G01K 11/12* | (2021.01) | |
| *B05B 1/18* | (2006.01) | |

(52) U.S. Cl.
CPC .............. *F16K 19/00* (2013.01); *G01K 11/12* (2013.01); *G01K 13/02* (2013.01); *B05B 1/18* (2013.01); *E03C 2001/0418* (2013.01); *E03C 2201/30* (2013.01); *G01K 13/026* (2021.01); *G01K 2207/00* (2013.01)

(58) Field of Classification Search
USPC ..................................................... 4/596–614
See application file for complete search history.

(56) References Cited

U.S. PATENT DOCUMENTS

| | | | |
|---|---|---|---|
| 5,806,582 A | 9/1998 | Magliochetti | |
| 5,913,614 A | 6/1999 | Smith et al. | |
| 6,098,213 A * | 8/2000 | Chu | E03B 1/042 |
| | | | 4/597 |
| 6,643,862 B2 | 11/2003 | Aitken | |
| 6,997,200 B2 | 2/2006 | King | |
| 7,089,955 B1 * | 8/2006 | Komro, Sr. | B60R 15/00 |
| | | | 137/341 |
| 2003/0213850 A1 | 11/2003 | Mayer et al. | |
| 2004/0159353 A1 | 8/2004 | King | |
| 2005/0205680 A1 | 9/2005 | Valente | |
| 2009/0019636 A1 | 1/2009 | Kajuch et al. | |
| 2010/0282343 A1* | 11/2010 | Simoneschi | E03B 1/048 |
| | | | 137/551 |
| 2011/0146800 A1 | 6/2011 | Jallon et al. | |
| 2011/0168266 A1* | 7/2011 | Fiora | E03B 1/048 |
| | | | 137/1 |
| 2012/0104114 A1 | 5/2012 | Zhou et al. | |
| 2012/0266961 A1* | 10/2012 | Holmes | E03B 7/045 |
| | | | 137/1 |

FOREIGN PATENT DOCUMENTS

| | | |
|---|---|---|
| DE | 29608844 U1 | 8/1996 |
| JP | S62-070879 U | 5/1987 |
| JP | S63-032659 U | 3/1988 |
| JP | H05180454 A | 7/1993 |
| JP | 3052344 U | 9/1998 |
| JP | 315212 U | 7/2009 |
| JP | 2011500990 | 1/2011 |
| JP | 2011089297 A | 5/2011 |
| JP | 2012176208 | 9/2012 |
| JP | 2013124519 A | 6/2013 |
| JP | 2013-0199759 | 10/2013 |
| KR | 20-0265886 | 2/2002 |
| KR | 20130076184 A | 7/2013 |
| KR | 10-2015-0117008 | 10/2015 |
| WO | 2007019648 A1 | 2/2007 |
| WO | 2010127491 | 11/2010 |

OTHER PUBLICATIONS

Written Opinion from Korean Intellectual Property Office dated Aug. 26, 2016 for related PCT Application No. PCT/US2016/033140.
International Preliminary Report on Patentability from the International Bureau of WIPO dated May 15, 2018 for related PCT Application No. PCT/US2016/033140.
Search Report from European Patent Office on related EP application (EP16864697.4) dated Aug. 16, 2019.
Non-Final Office Action on co-pending (U.S. Appl. No. dated 14/937,587) dated Dec. 11, 2017.
Non-Final Office Action on co-pending (U.S. Appl. No. 15/688,547) dated Mar. 29, 2018.
Final Office Action on co-pending (U.S. Appl. No. dated 14/937,587) dated May 25, 2018.
Final Office Action on co-pending (U.S. Appl. No. 15/688,547) dated Oct. 30, 2018.
Non-Final Office Action on co-pending (U.S. Appl. No. 14/937,587) dated Oct. 31, 2018.
Non-Final Office Action on co-pending (U.S. Appl. No. 15/688,547) dated Feb. 7, 2019.
Final Office Action on co-pending (U.S. Appl. No. 14/937,587) dated Apr. 29, 2019.
Final Office Action on co-pending (U.S. Appl. No. 15/688,547) dated Jul. 22, 2019.
Office Action on corresponding foreign application (JP Application No. 2018-544021) from the Japanese Patent Office dated Mar. 24, 2020.

\* cited by examiner

| TYPICAL PROPERTIES | | TEST METHOD | TYPICAL VALUE |
|---|---|---|---|
| TENSILE STRENGTH AT YIELD (N/mm$^2$) | | ASTM D638 | 45 |
| ELONGATION AT YIELD (%) | | ASTM D638 | 5 |
| MODULUS OF ELASTICITY (N/mm*) | | ASTM D638 | 607 |
| HARDNESS, Shore D (Initial, 15 s) | | ASTM D2240 | 80, 75.5 |
| SPECIFIC GRAVITY | | ASTM D792 | 1.33 |
| TORQUE RHEOMETER RESULTS | | | |
| FUSION TORQUE (m-g) | | ASTM D2538 | 7080 |
| EQULIBRIUM TORQUE (m-g) | | ASTM D2538 | 1500 |
| TEMPERATURE EQUI. TQ. (°C) | | ASTM D2538 | 193.5 |
| STABILITY TIME (min) CONDITIONING 1. Mixer Temperature: 180 °C 2. Speed: 60 rpm 3. Sample Weight 60 gr | | ASTM D2538 | 58 |
| HEAT STABILITY BY OVEN ESTABILITY TIME (°C) CONDITIONING: 1. Roll Mill 10 min at 170 °C pellets of sample 2. Oven Temperature: 195 °C | | ASTM D2115 | ≥29 |
| COLOR (Code 05) | | | |
| L | | SPECTRO | 77.5 |
| a | | PHOTOMETER | 0.19 |
| b | | | -8.36 |
| Transmittance (%) | | ASTM D-1003 | 67 |
| Haze (%) CONDITIONING: 1. Iluminante A(D65), 10 2. Plaque 6 mm | | ASTM D-1003 | 16.8 |

FIG. 8   Table 1

WATER CONSERVING SHOWER SYSTEM AND THERMOCHROMIC FIXTURES USED THEREIN

CROSS-REFERENCE TO RELATED APPLICATION

This application is a divisional of application U.S. application Ser. No. 16/552,374, filed on Aug. 27, 2019, which is a divisional of application U.S. application Ser. No. 14/937,587, filed on Nov. 10, 2015. The disclosures of which are incorporated herein by reference in their entirety.

FEDERALLY SPONSORED RESEARCH OR DEVELOPMENT

Not Applicable.

BACKGROUND

This disclosure, in a first aspect, relates to domestic plumbing systems, particularly shower systems, that employ a thermochromic fixture to provide a visual indication of water temperature, so that water can be recirculated to a reservoir until it reaches a predetermined temperature, and allowed to flow out of a shower head upon reaching the predetermined temperature. The disclosure also relates, in a second aspect, to a method of conserving water in a domestic plumbing system, through the use of a thermochromic fixture in such systems. In a third aspect, the disclosure relates to a thermochromic fixture for use in the aforesaid systems and method. In a fourth aspect, the disclosure relates to a polyvinyl chloride (PVC) formulation that exhibits thermochromic properties for use in such fixtures.

Shower systems for mobile applications (recreation vehicles, trailers, boats, ships, and the like) typically use water from a fresh water reservoir or tank of limited capacity. Water is directed from the tank under pressure to a shower head, with a portion of the water going through a heating unit to provide hot water, and a portion bypassing the heating unit to provide cold water. The hot water and cold water are mixed in variable proportions by a mixing valve upstream from the shower head. The heating unit, in many mobile applications, is electrically or propane powered, and may be energized only shortly before the shower is used. Also, depending on the layout of the shower plumbing, there may be a considerable volume of cool water between the heating unit and the shower head. In either case, a considerable volume of water may flow through the shower head before sufficient hot water is available to provide a shower with the desired temperature. This "unheated" flow simply goes down the drain, is thus wasted. The fresh water tank therefore must be filled more often (which is often not feasible), or water consumption in the craft or vehicle must be constrained to a level that many users would find inconvenient or uncomfortable.

It would therefore be desirable to provide a mechanism whereby the "unheated" water flow can be diverted back into the fresh water tank or reservoir for re-use, with water then being directed to the shower head only when it reaches a pre-determined temperature.

SUMMARY

The present disclosure, in one aspect, relates to a shower system or other domestic water delivery or plumbing system requiring heated water, comprising a source of unheated water, a heating mechanism for heating a portion of the water from the source, a mixing valve operable for mixing unheated water and heated water to a variable degree, a dispensing device configured for dispensing the mixed heated and unheated water, a thermal indicator between the mixing valve and the dispensing device that is configured to provide a visible indication of the mixed water having achieved a predetermined temperature, and a manually-actuated diverter valve operable to direct water flow selectively to either the dispensing device or back to the source.

In an exemplary embodiment, the thermal indicator is a fitting or element of thermochromic material, wherein the fitting or element, or a portion thereof, changes undergoes a rapid and obvious color change when water flowing through it reaches a predetermined temperature, and then reverts back to its original color when the flow of water stops or the water temperature decreases below the predetermined temperature. The thermochromic material is preferably a polymer incorporating a thermochromic pigment. In one embodiment, the polymer is polyvinyl chloride (PVC).

In an exemplary embodiment, the domestic plumbing or water delivery system is a shower system for a mobile application, such as a land vehicle (RV, trailer) or water craft (boat, ship). The water source in a mobile system is typically a fresh water reservoir on board the vehicle or craft. The water heating unit may be a hot water tank in fluid communication with the reservoir and having either an internal or external heating element. The heating element may be selectively energized when hot water is desired, or it may be energized thermostatically when the temperature of the water in the hot water tank is below a predetermined temperature. In such systems, heated water from the hot water tank is mixed, in variable proportions, with cold water from the reservoir in a mixing valve, of conventional design, whereby the temperature of the mixed water flowing from the mixing valve to a dispensing device in the nature of a shower head is selected according to the desires of the user. Before reaching the shower head, the mixed water flows through a thermal indicator, for example, of the thermochromic type mentioned above, to alert the user when the water flowing out of the mixing valve has achieved the desired temperature. After flowing through the thermal indicator, the water flows to a manually-operable diverter valve that can be selectively moved between a first position in which the water is returned to the reservoir via a return conduit, and a second position in which water is directed to the shower head. Thus, the diverter valve can be maintained in, or moved to, its first position until the thermal indicator indicates a predetermined temperature of the water flowing through it, after which the diverter valve can be moved in its second position.

In accordance with a second aspect, the disclosure relates to a method of conserving water in a domestic water system, of the type having a reservoir, a water heating unit fluidly coupled to the reservoir, a mixing valve fluidly downstream from, and fluidly coupled to the reservoir and the water heating unit, and a dispensing unit fluidly coupled to and downstream from the mixing valve, the method comprising: (a) providing a visual indication of the temperature of water flowing out of the mixing valve; (b) directing water from the mixing valve back to the reservoir until a predetermined water temperature is reached; and (c) once the predetermined water temperature is reached, directing water from the mixing valve to the dispensing unit. In accordance with embodiments of the disclosure, the visual indication of water temperature is provided by a thermochromic fixture or conduit downstream from the mixing valve.

In accordance with a third aspect, this disclosure relates to a thermochromic fitting or element for use in the aforesaid system and method, wherein at least a portion of the fitting or element is made of a thermochromic material, such as a thermochromic polymeric material, preferably a PVC in which is mixed, prior to curing, a thermochromic pigment selected to change color rapidly in response to a flow of liquid through the fixture reaching a preselected or predetermined minimum temperature. In some embodiments, the thermochromic fitting or element includes a conduit, at least a portion of which is made of thermochromic material, fluidly connected in the system between the mixing valve and the dispensing unit. In other embodiments, a thermochromic fitting comprises an inlet configured to be fluidly coupled to an outlet of the mixing valve, an outlet configured to be fluidly coupled to an inlet of the diverter valve, an internal barrier configured to create a tortuous fluid path between the inlet and the outlet, and a thermochromic element disposed in the tortuous fluid path and visible to display a thermochromic color change to a user.

In accordance with another aspect, the disclosure relates to a thermochromic polymer and a method of manufacturing it. Broadly, the polymer comprises a PVC composition containing a thermochromic pigment that is selected for its ability to undergo a rapid and marked color change in response to contact with a fluid having a predetermined temperature. The pigment is mixed, as dry pellets or the like, into the PVC while the PVC is in a liquid state, prior to extruding or molding and curing the PVC to form a thermochromic fixture. The amount of pigment added to the PVC and the maximum processing temperature of the PVC are controlled to maintain the desired thermochromic properties.

BRIEF DESCRIPTION OF THE DRAWINGS

FIG. 8 is a table ("Table 1") showing the physical properties of an exemplary PVC compound used in a thermochromic fitting or element in accordance with an aspect of the disclosure.

DETAILED DESCRIPTION

Figure 1:
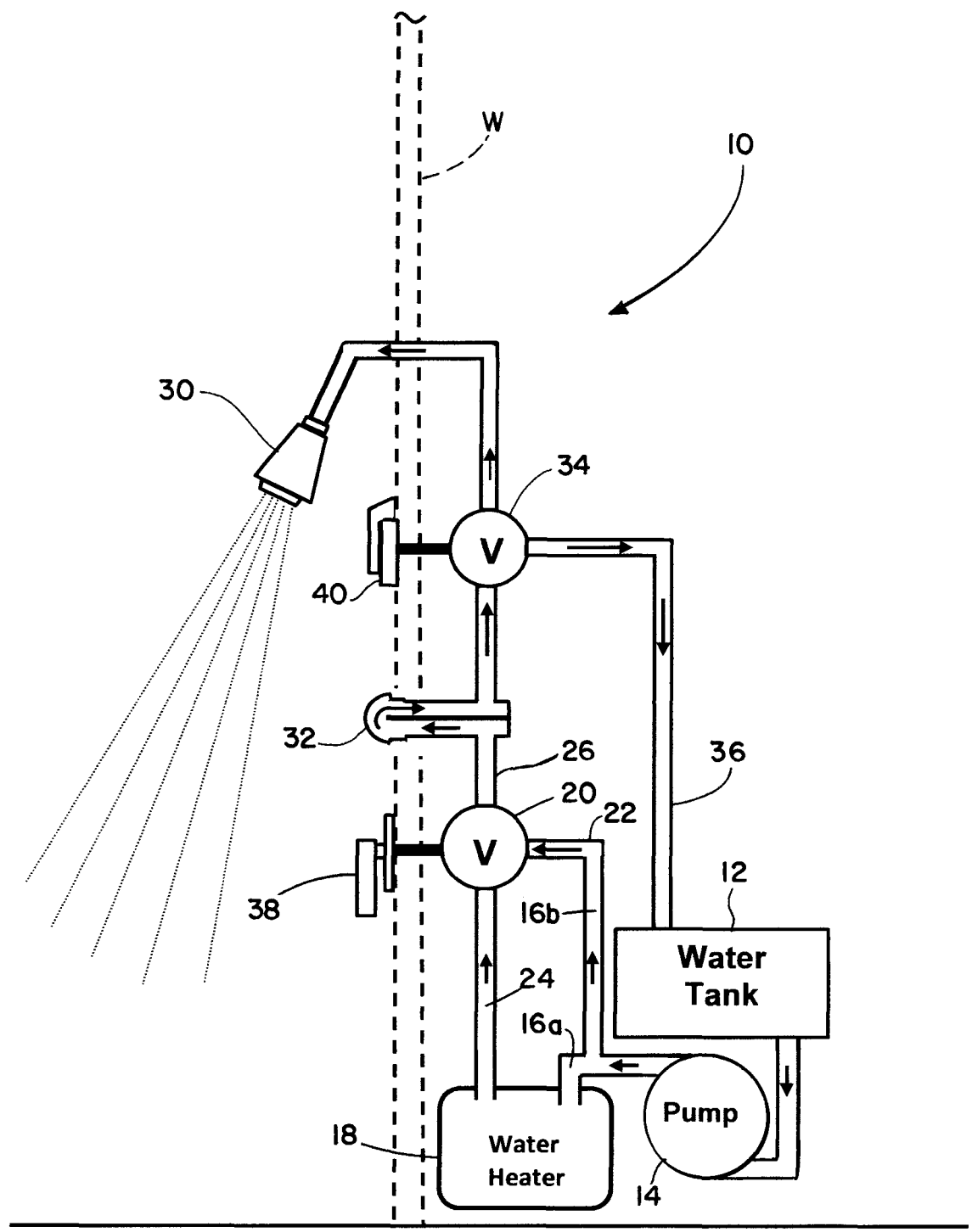
FIG. 1 is a semi-schematic view of an exemplary embodiment of a water-conserving shower system for a mobile application in accordance with an aspect of the disclosure.

Referring now to the drawings, FIG. 1 shows a water-conserving shower system 10 for a mobile application, in accordance with an aspect of the disclosure. The system 10 is suitable for use in a land vehicle, such as an RV or trailer, or in a water craft, such as a boat or ship. The system 10 employs a water reservoir or tank 12 with a fixed volumetric capacity, configured to be filled with water (usually fresh water). A pump 14 (typically electrically-powered) pumps water from the tank 12 to a tank outlet conduit having a first 16a branch that directs water to a conventional water heating unit 18, and a second branch 16b fluidly connected to a first inlet 19 of a mixing valve 20 through a cold water conduit 22. The water in the tank 12 is typically at ambient temperature, and for the purposes of this disclosure may be termed "cold" water. A hot water conduit 24 directs heated water from the heating unit 18 to a second inlet 23 of the mixing valve 20. Water is typically heated in the heating unit 18 to a temperature of about 120° F.-160° F. (49° C.-71° C.), although higher temperatures are sometimes achieved. The heated water thus may be termed "hot" water for the purposes of this disclosure. Thus, the mixing valve 20 (which is of any conventional design commonly used in showers) receives cold water and hot water flows, under pressure, from the tank 12 and the heating unit 18, respectively, and mixes the flows in the appropriate proportions to provide a mixed water flow of the desired temperature at an outlet 25.

As in conventional shower systems, an outlet conduit 26 is configured to carry the mixed water flow from the mixing valve outlet 25 to a water dispensing device 30. In the embodiment shown in FIGS. 1-3 and 7, the dispensing device 30 is a shower head, and it will be referred to as such. Nevertheless, it will be appreciated that, in other aspects of the disclosure, the dispensing device may be a sink faucet configured to dispense an adjustable mixture of hot and cold water, or a water inlet in a hot tub or spa. In the system 10 in accordance with this disclosure, a thermal indicator 32 (described in detail below) is disposed within the outlet conduit 26 downstream from the mixing valve 20. The thermal indicator 32, as discussed below, is a fixture configured as a "T" fitting, and it provides a visual indication to a shower user (not shown) when the temperature of the water in the outlet conduit 26 has reached a predetermined temperature.

As shown in FIG. 1, a diverter valve 34 is disposed in the outlet conduit 26 between the thermal indicator 34 and the shower head 30; that is downstream from the thermal indicator 32. (As will be discussed below, an alternative location for diverter valve is upstream from the thermal indicator.) The diverter valve 34, as discussed below, has a "return" position in which water in the outlet conduit 26 is diverted back to the tank 12 through a return conduit 36 before the water reaches the shower head 30. The diverter valve 34 is moveable by the user to a "shower" position in which water is allowed to flow from the outlet conduit 26 to the shower head 30 when the desired water temperature in the outlet conduit 26 is indicated by the thermal indicator 32.

As shown in FIG. 1, all of the above-mentioned components of the system 10, except for the shower head 30 and the thermal indicator 32, are located behind a wall W, which may be a load-bearing wall, a partition, or a bulkhead. The mixing valve 20 is actuated by, and operatively connected to, a control handle 38 or the like disposed in front of the wall W. Similarly, the diverter valve 34 is operatively connected to a diverter valve actuator 40 disposed in front of the wall W.

In operation, with the diverter valve 34 in the "return" position, the user turns on the shower by moving the mixing valve 20 from a "shut" position (typical in conventional mixing valves) to a position that provides a mixed flow in the outlet conduit 26 of cold water from the reservoir or tank 12 and hot water from the heating unit 14 to achieve the user's desired shower water temperature. This mixed flow is returned to the reservoir or tank 12 through the diverter valve 34 and the return conduit 36. When the thermal indicator 32 indicates (e.g., by a color change, as discussed below) that the water in the outlet conduit 26 has reached a predetermined temperature, the user moves the diverter valve 34 to its "shower" position, thereby directing the water from the outlet conduit 26 to the shower head 30. The user, of course, may then operate the mixing valve 20 for further adjustment of the shower water temperature by varying the proportion of hot and cold water in the mixture directed into the outlet conduit 26.

Figure 2:
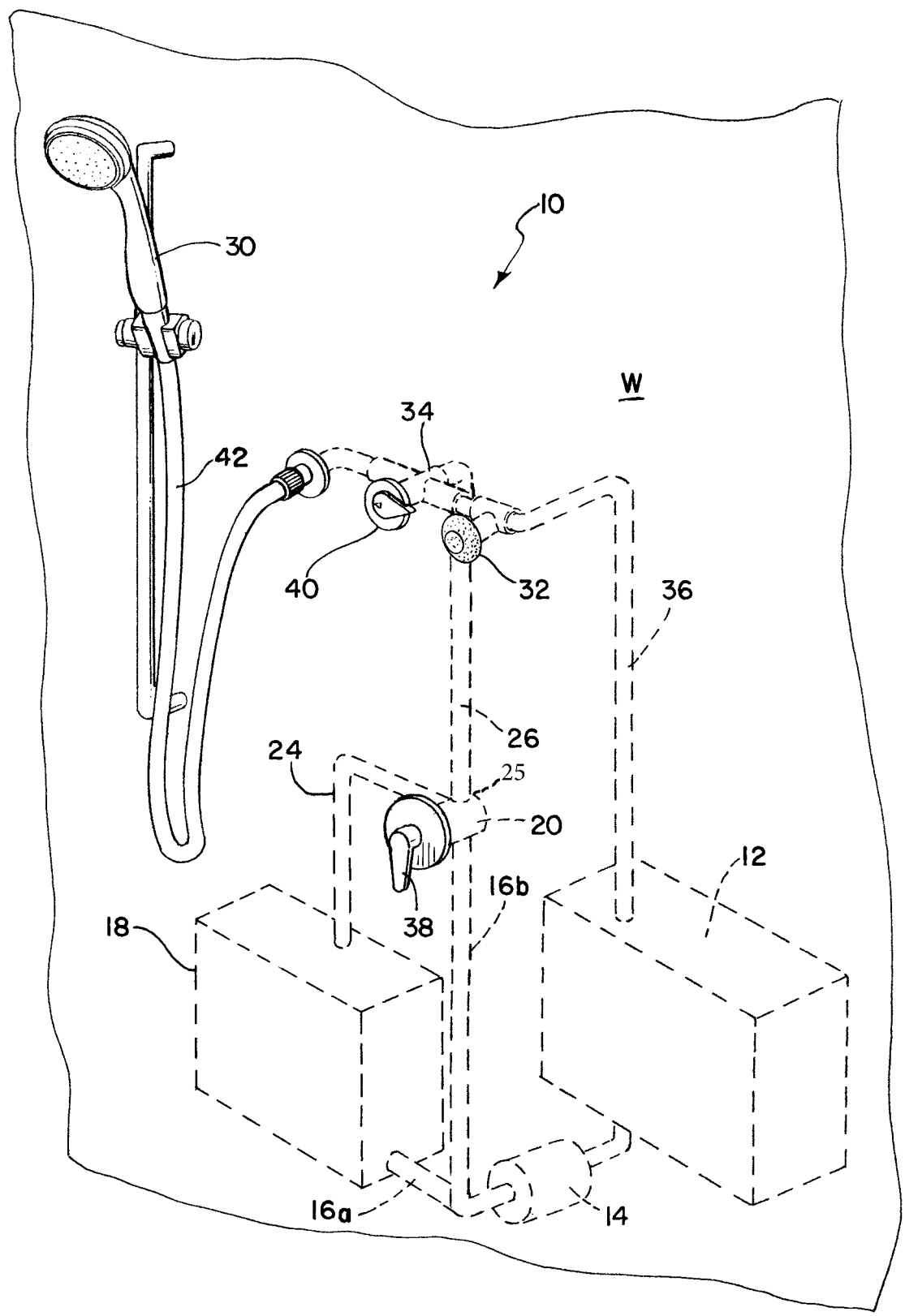
FIG. 2 is a simplified view of an exemplary embodiment of a water-conserving shower system for a mobile application in accordance with an aspect of the disclosure.

A specific embodiment of the shower system 10 is shown in FIG. 2. This embodiment is well-suited for an "original equipment" application, whereby a shower system is configured in accordance with this disclosure prior to installation, although it may be suitable for retrofit applications, in which a previously-installed shower system is modified in accordance with this disclosure. As illustrated in FIG. 2, all of the above-described components that are located behind the wall W are shown in phantom. In this figure, the mixing valve has a first (cold water) inlet 21, a second (hot water) inlet 23, and an outlet 25. In this embodiment, the shower head 30 is fluidly connected to the outlet conduit 26 by a flexible hose 42. The thermal indicator 32 is located in the outlet conduit 26 upstream from the diverter valve 34; i.e., the diverter valve 34 is between the thermal indicator 32 and the shower head 30, as in FIG. 1. As shown in FIG. 2, the diverter valve 34 is of a rotary type, well-known in the art, that is actuated by an actuator 40 configured as a dial that is rotatable by the user to move the diverter valve between the above-described first and second positions.

Figure 3:
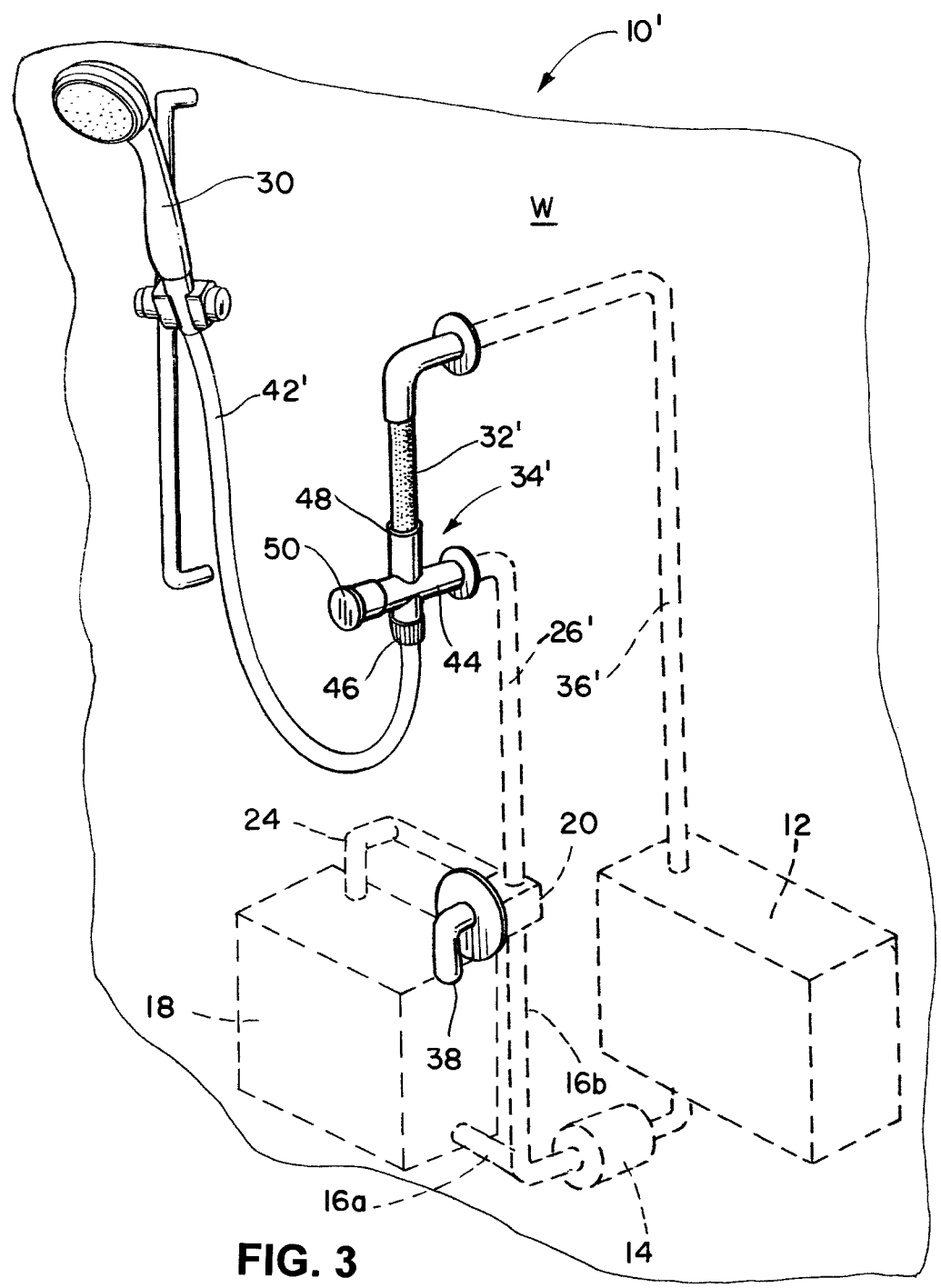
FIG. 3 is a simplified view of another exemplary embodiment of a water-conserving shower system in accordance with an aspect of the disclosure.

Another embodiment of the shower system in accordance with this disclosure is shown in FIG. 3 and indicated by the numeral 10'. This embodiment is well-suited for a retrofit application, in which a previously-installed shower system is modified to incorporate the features of this disclosure. The embodiment of FIG. 3 is essentially the same as that of FIG. 2, except for the locations and configurations of the thermal indicator, the diverter valve, and the diverter valve actuator. Specifically, this embodiment includes a diverter valve 34' with an inlet 44 fluidly connected to the downstream end of an outlet conduit 26', a first outlet 46 fluidly connected to a shower head hose 42', and a second outlet 48 fluidly connected to the upstream end of a tubular thermal indicator 32'. The downstream end of the thermal indicator 32' is fluidly connected to the water tank 12 by a return conduit 36'. Thus, in this embodiment, the outlet conduit 26' has a downstream end terminating at the inlet 44 of the diverter valve 34', while the thermal indicator 32', which is located downstream from the diverter valve 34', is configured as a short conduit connecting the second outlet 48 of the diverter valve 34' to the return conduit 36'. As will be described in more detail below, the diverter valve 34' is advantageously a linearly-actuated "push-pull" valve, having a first axial position in which water flows from the inlet 44 to the shower head hose 42' through first outlet 46, and a second axial position in which water flows from the inlet 44 to the return conduit 36' through the second outlet 48. The diverter valve 34' is operatively connected to a push-pull knob 50 that is operable by the user to move the diverter valve 34' between its first and second positions.

Figure 4:
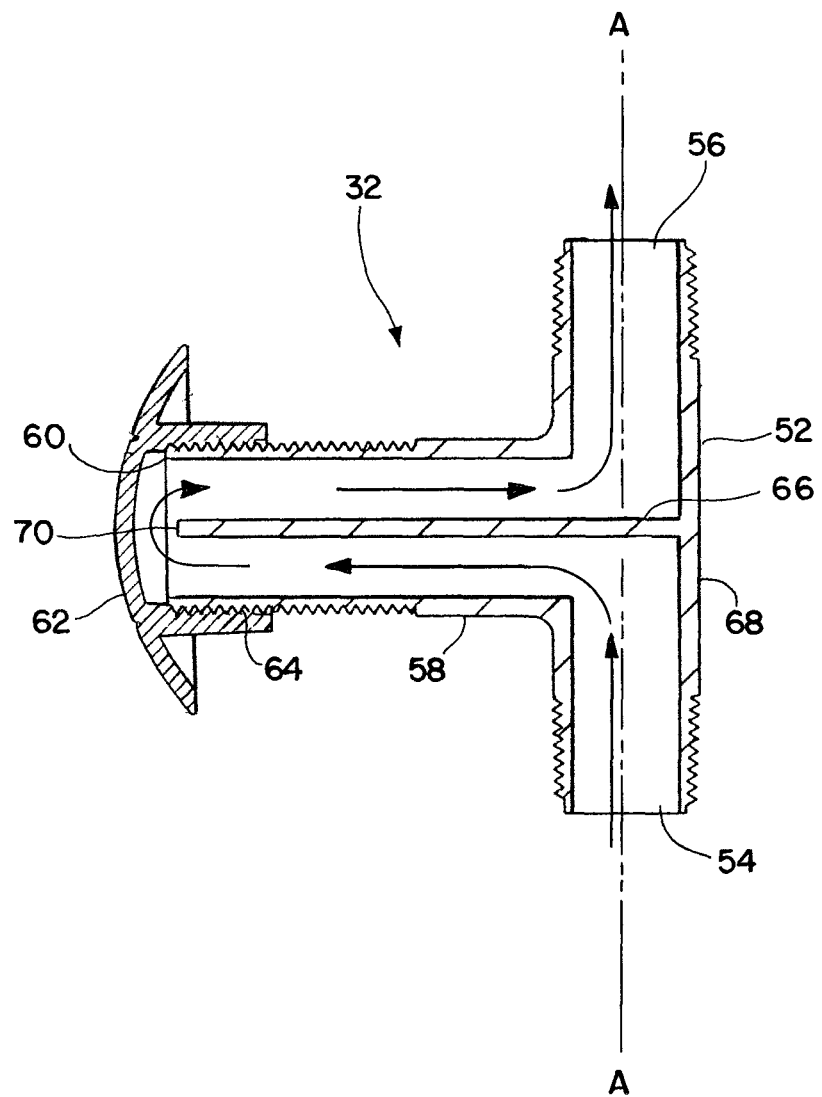
FIG. 4 is a cross-sectional view of an exemplary embodiment of a thermochromic fitting in accordance with an aspect of the disclosure.

FIG. 4 illustrates a thermal indicator 32, of the type shown in FIGS. 1 and 2. As noted above, the thermal indicator 32 is a fixture configured as a "T" fitting, with a main portion 52 defining an inlet 54 and an outlet 56 arranged substantially co-linearly so as to define an axis A. The "T" fitting includes a hollow branch or stem 58 perpendicular to the axis A defined by the inlet 54 and the outlet 56, and in fluid communication with both the inlet 54 and the outlet 56. The branch or stem 58 has an open end 60 that is closed by a thermochromic element 62 that may be advantageously configured, in some embodiments, as a domed cap, as shown in FIG. 4. The thermochromic element 62 may be permanently fixed to the open end 60 of the branch 58, or, as shown, removably secured thereto by a threaded connection 64. A barrier or partition 66 extends axially through the center of the branch or stem 58 from a common wall 68 defining the inlet 54 and the outlet 56 to a free end 70 terminating at or near the open end 60 of the branch or stem 58, whereby a clearance is defined between the free end 70 of the barrier 66 and an interior surface of the thermochromic element 62. Thus, a flow path for a fluid (e.g., water) is defined within the "T" fitting from the inlet 54, along a first side of the barrier 66, through the clearance between the free end 70 of the barrier 66 and the interior surface of the thermochromic element 62, then along a second side of the barrier 66, to the outlet 56, as indicated by the arrows in FIG. 4. This flow path directs fluid from the inlet 54 into contact with the interior surface of the thermochromic element 62, where its rate of flow decreases slightly as it changes direction, whereby the thermochromic material of the thermochromic element 62 can react to the temperature of the fluid, as described below.

The "T" fitting of the thermal indicator 32 described above is advantageously made of a suitable plastic, such as polyvinyl chloride (PVC), or, except for the thermochromic element 62, it may be made of copper, steel, or aluminum pipe. The thermochromic element 62, in any case, is made of PVC that is provided with thermochromic properties by the mixture of a thermochromic pigment into the PVC while it is still in an uncured liquid state, as discussed more fully below. The thermochromic PVC is designed to undergo a marked, and relatively rapid, change of color upon being contacted by a fluid medium having at least a predetermined transition temperature. In other words, a fluid-contacting component or element made of a thermochromic PVC maintains a first color until the contacting fluid reaches the predetermined transition temperature, at which point the thermochromic component or element (such as the domed cap 62 shown in FIG. 4) changes to a second color that is noticeably different from the first color. If the contacting fluid cools below the predetermined transition temperature, the thermochromic element reverts to original (first) temperature. The predetermined transition temperature at which the color change takes place is determined by a number of factors, including the density of the PVC, the type of thermochromic pigment used, and the concentration of the pigment in the PVC.

Figure 9B:
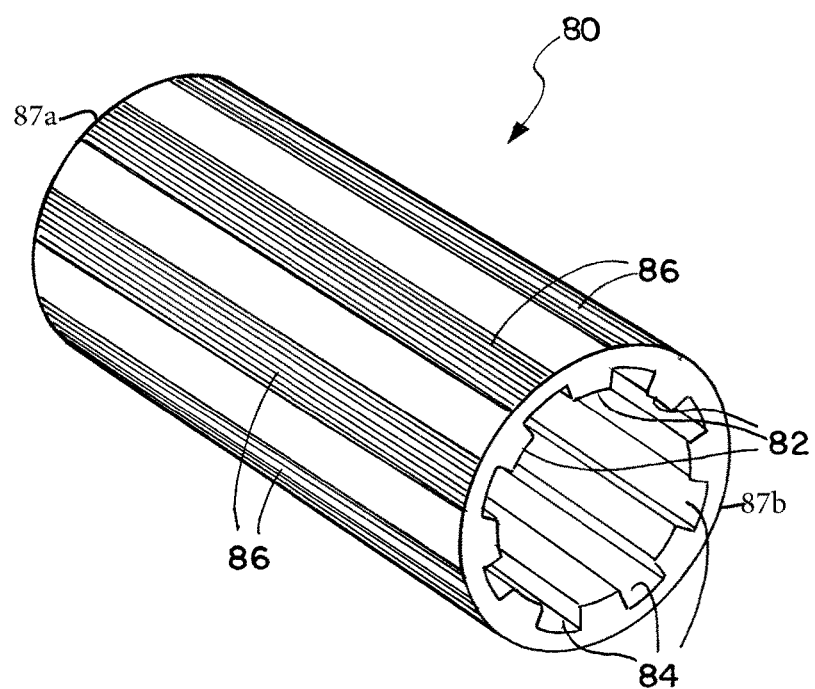
FIGS. 9A and 9B are a cross-sectional view and a perspective view, respectively, of another exemplary embodiment of a thermochromic fitting in accordance with an aspect of the disclosure.
Figure 9A:
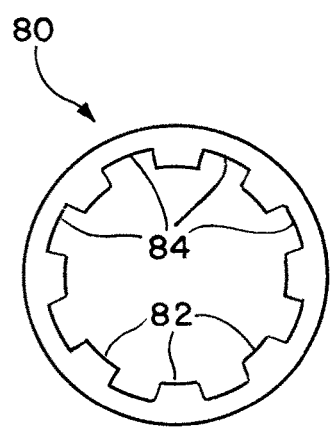

An exemplary embodiment of the tubular thermochromic element or fitting 32' of the system 10' shown in FIG. 3 is illustrated in FIGS. 9A and 9B. In this embodiment, the PVC with thermochromic properties is formed (as by extruding) into a conduit 80 of suitable length. The conduit 80 has an inlet (upstream) end 87a and an outlet (downstream) end 87b. While the tubular fitting or element may be made with a smooth, continuous internal wall surface, it has been found that forming the internal wall surface with a plurality of ribs or lands 82, as shown in FIGS. 9A and 9B, is particularly advantageous. This is because the ribbed construction allows for a thinner tubular wall between the ribs or lands 82, thereby speeding the thermochromic reaction in the relatively thin-walled areas or grooves 84 between the ribs or lands 82 due to more efficient transfer of heat from the fluid (e.g., water) flowing through the conduit 80 to the conduit material. Furthermore, the differing rates of color change between the lands 82 and grooves 84 provide, at least temporarily, a distinct pattern of stripes 86 (FIG. 9B) that is visually more striking to many people, including those people having a degree of color blindness. The lands or ribs 82 may be axial (longitudinal) as shown, or they may be helical, with grooves 84 of corresponding shape, to provide a spiral pattern upon attainment of the transition temperature. In an exemplary embodiment, the tubular element 80 may have an outside diameter of 0.840 in. (2.13 cm), a wall thickness at the ribs or lands 82 of 0.602 in. (15.3 mm), and a wall thickness at the grooves 84 of 0.060 in. (1.5 mm).

While various thermochromic materials are known (see, e.g., https://en.wikipedia.org/wiki/Thermochromism), it is believed by the Applicant that a practical thermochromic PVC has not heretofore been developed that is suitable for a domestic plumbing application, as in the present disclosure. An exemplary thermochromic PVC material in accordance with this disclosure is made with a PVC compound having the physical properties described in Table 1 (FIG. 8). While this PVC compound is in an uncured liquid state, a thermochromic pigment is mixed into the PVC. In an exemplary embodiment, the pigment is of the type marketed by PolyOne Corporation, of Avon Lake, Ohio under the trade name "Oncolor FX Thermochromic Blue to Nat (CC10221081)," or a suitable equivalent, of the type described generally at http://www.hali-pigment.com/html_products/Thermochromic-pigment-21.html (the subject matter of which is incorporated herein by reference), and also available from QCR Solutions Corp. of Fort St. Lucie, Fla., and Matsui International Co., Inc. of Gardena, Calif. (the latter under the trade name "CHROMICOLOR"). The pigment is preferably provided as dry pellets, and is mixed into the liquid PVC at a concentration of approximately 1 kg. pigment per 145 kg. PVC, preferably after creating 20%-25% masterbatch of the pigment, with a 3%-5% let down ratio (LDR). The PVC is then formed (e.g., by molding or extruding) into the configuration of the appropriate thermochromic component or element (e.g., the domed cap 62 of the "T" fitting shown in FIG. 4, as used in the system 10 of FIG. 2, or the tubular thermal indicator 32' of the system 10' of the embodiment of FIG. 3, as described above in connection with FIG. 9), and then cured by known curing methods.

It is important, in order to preserve the thermochromic properties of the PVC after it is formed into the thermochromic component or element, to assure that the PVC does not exceed a temperature of about 320° F. (160° C.) during the manufacturing process, including curing, although, if processed under low pressure, temperatures up to about 400° F. (204° C.) may be tolerated. The resultant composition will change from a first color (blue) to a second color (white) at a transition temperature of about 91° F. (approximately 32.5° C.). Different transition temperatures, colors, or color intensities can be provided by using other suitable thermochromic pigments, varying the concentration of the pigment in the PVC, or varying the physical properties of the PVC.

Figure 5:
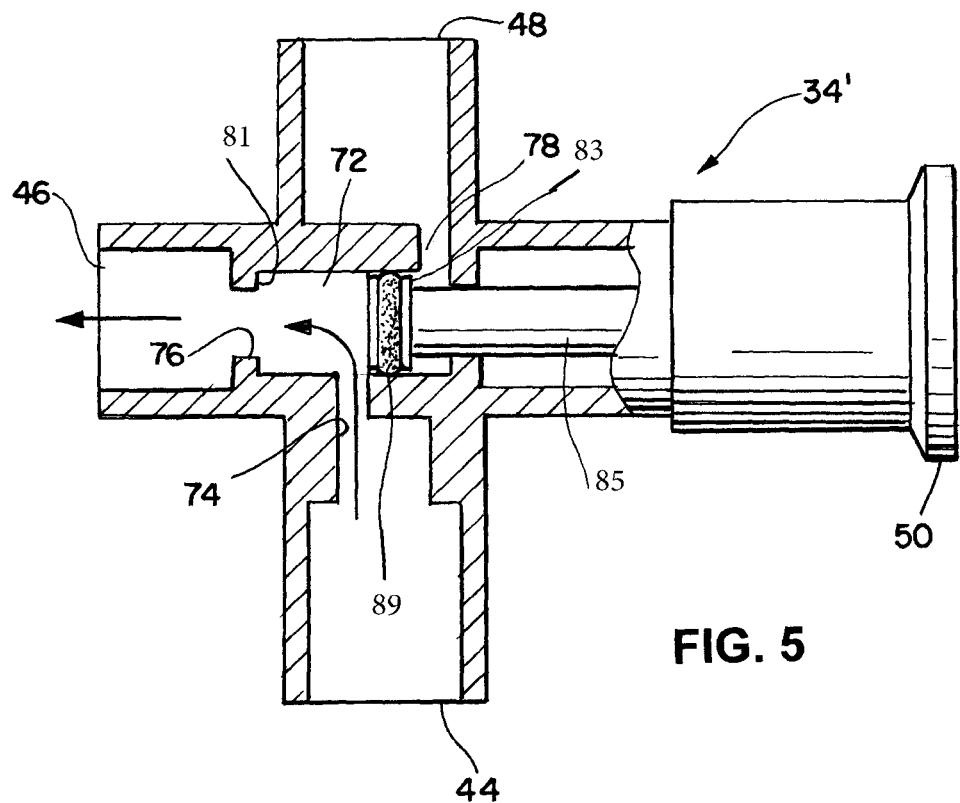
FIG. 5 is an elevation view, partially in cross-section, of an exemplary embodiment of a diverter valve that may be used in a water-conserving shower system in accordance with the disclosure, showing the diverter valve in a first position.
Figure 6:
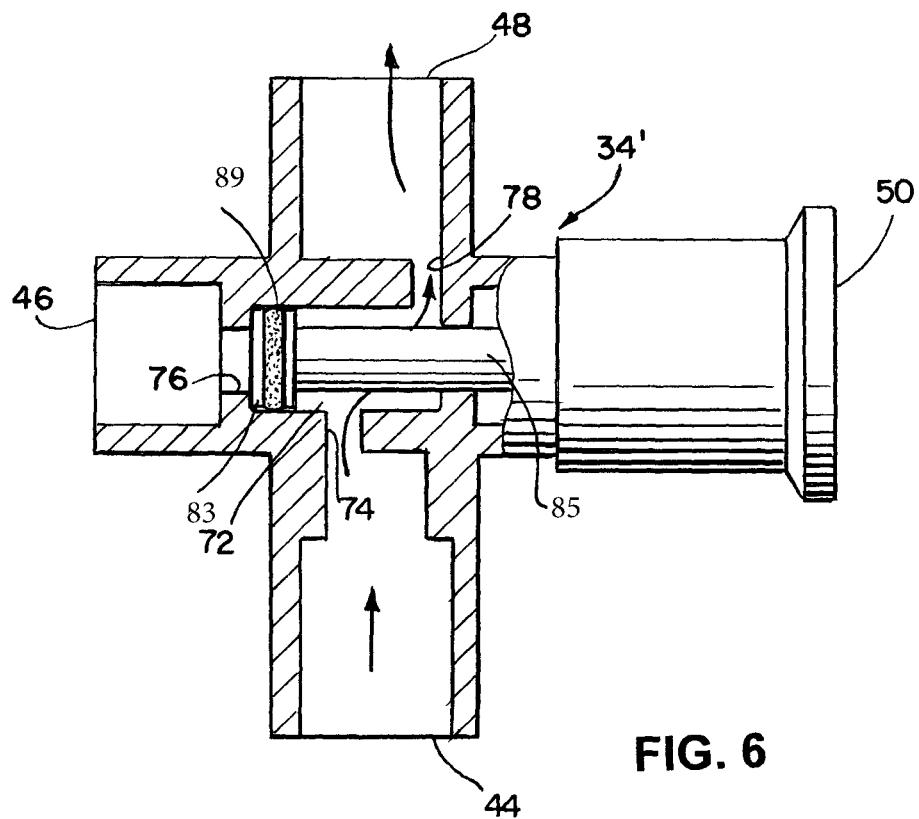
FIG. 6 is an elevation view, partially in cross-section, of the diverter valve of FIG. 5, showing the diverter valve in a second position.

FIGS. 5 and 6 illustrate an exemplary embodiment of the push-pull diverter valve 34' described above in connection with the embodiment of FIG. 3. The diverter valve 34', as described above, includes an inlet 44 configured to be fluidly connected to the downstream end of the outlet conduit 26', a first outlet 46 configured to be fluidly connected to the shower head hose 42', and a second outlet 48 configured to be fluidly connected to the upstream end of the tubular thermal indicator 32'. The diverter valve 34' further includes an inner chamber 72 communicating with the inlet 44 through a first internal passage 74, with the first outlet 46 through a second internal passage 76, and the second outlet 48 through a third internal passage 78. An annular valve seat 81 is advantageously provided at the entrance of the first outlet 46 from the inner chamber 72. A disc-shaped valve element 83, connected to the push-pull actuator knob 50 by a valve shaft 85, is configured to have a slidable sealing engagement with the interior wall defining the inner chamber 72. To this end, it may be advantageous, in some embodiments, to provide a sealing O-ring 89 or the like around the perimeter of the valve element 83.

As discussed above, the diverter valve 34' is operable between a first position and a second position. In the first position (FIG. 5), water is directed from the inlet 44 to the first outlet 46. In the first position, the knob 50 is pulled linearly outward, whereby the valve element 83 is pulled, via the shaft 85, to a first position in which it is displaced from the valve seat 81, thereby providing a fluid path from the inlet 44, through the first internal passage 74, the inner chamber 72, and the second internal passage, to the first outlet 46. At the same time, the valve element 83 is positioned within the inner chamber 72 so as to block the third internal passage 78 from the inner chamber 72 to the second outlet 48. Thus, water is directed to the shower head hose 42' (FIG. 3), and blocked from the return conduit 36'.

In the second position of the diverter valve 34' (FIG. 6), water is directed from the inlet 44 to the second outlet 48. In the second position, the knob 50 is pushed linearly inward, whereby the valve element is urged, via the shaft 85, against the valve seat 81, closing the second internal passage 76 from the inner chamber 72 to the first outlet 46, while opening a fluid path from the inlet 44, through the first internal passage 44, the inner chamber 72, and the third internal passage 78, to the second outlet 48. Thus, water is directed to the return conduit 36' (via the tubular thermal indicator 32') and blocked from the shower head hose 42'.

Figure 7:
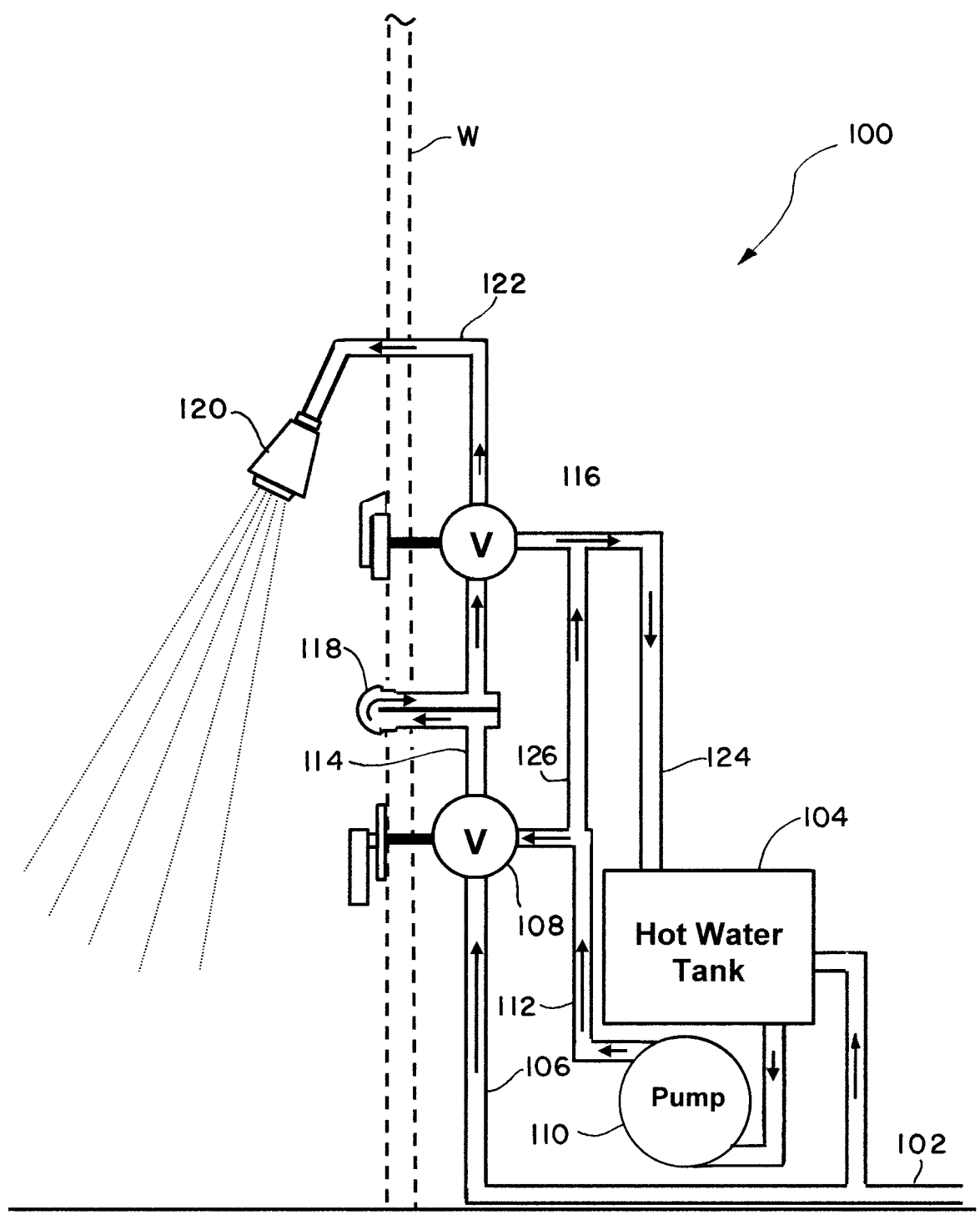
FIG. 7 is a semi-diagrammatic view of an exemplary embodiment of a water-conserving shower system for a fixed or permanent application, in accordance with an aspect of the disclosure.

FIG. 7 shows a simplified, semi-schematic view of an exemplary embodiment of a shower system 100, in accordance with an aspect of the disclosure, for use in a non-mobile application, such as, for example, in a building receiving its water from a municipal water supply. In the system 100, water is supplied from a domestic water pipe 102 connected to a municipal water line (not shown). Some of the water is directed to a hot water tank 104, in a conventional manner. A cold water intake conduit 106 receives water from the domestic water line 102 and directs the water to a cold water inlet (not shown) of a conventional mixing valve 108. Hot water from the tank 104 is directed under pressure (e.g., by an electric pump 110) to a hot water conduit 112, which directs the hot water to a hot water inlet (not shown) of the mixing valve 108.

As noted above, the mixing valve 108 is operable to adjust the mixture of hot and cold water to achieve the temperature desired by the use. The mixed water is then directed to an outlet conduit 114 and then to a diverter valve 116. Disposed in the outlet conduit 114 between the mixing valve 108 and the diverter valve 116 is a thermochromic thermal indicator 118, which may advantageously be of the "T" fitting type described above and illustrated in FIG. 4, or it may be the tubular type shown in FIG. 3. The diverter valve 116 may either be a rotary type, as shown above in FIG. 2, or it may be of the linearly-actuated "push-pull" type described above and shown in FIGS. 3, 5, and 6. In either case, the diverter valve 116 is selectively operable to direct water either to a shower head 120 (via a shower head conduit 122), or to a return conduit 124, which directs the water back to the hot water tank 104. As in the above-described mobile application embodiments, the thermal indicator 118 operates thermochromically to provide a visual indication (by a marked change in color) that the temperature of the water mixture in the outlet conduit 114 has reached a predetermined transition temperature, whereby the user can maintain the diverter valve in a position to divert water to the return conduit 124 until the predetermined transition temperature is reached, at which point the diverter valve 116 can be operated to direct water to the shower head 120.

The system 100 of FIG. 7 includes an optional "closed-loop" hot water circuit, of the type being increasingly used in many modern homes and other buildings. In such closed-loop circuits, any hot water that is not directed to the mixing valve 108 is recirculated back to the hot water tank 104 from the hot water conduit 112 by a bypass conduit 126 that communicates with the return conduit 124. An advantage of the closed-loop hot water circuit is that hot water is readily available at the mixing valve, with little or wait, and thus little or no wasted water. This advantage is offset, to at least some degree, by the need to run the hot water pump 110 more or less continuously, thereby using more electricity. By using the thermochromic thermal indicator 118, however, the pump 110 can be modified to run only "on demand," thereby reducing electrical power consumption. In this way, a user can turn on the pump 110 only when it is desired to use the shower. While it may take some time to deliver hot water from the tank 104 to the mixing valve, the diverter valve 116 can be operated to recirculate the water to the tank via the return conduit 124 until the thermal indicator shows that the desired water temperature has been reached. Only at that point would the user operate the diverter valve 116 to direct water to the shower head 120, thereby conserving water as well as electrical power.

What is claimed is:

1. A water-conserving shower system, comprising:
   a hot water source;
   a cold water source;
   a mixing valve having inlets configured to receive hot water from the hot water source and cold water from the cold water source and an outlet, the mixing valve being operable to produce a water mixture in the outlet of the hot water and the cold water in variable proportions;
   a diverter valve downstream from the mixing valve and having an inlet in fluid communication with the outlet of the mixing valve, the diverter valve being operable to direct water received from the mixing valve outlet selectively to one of a first diverter valve outlet and a second diverter valve outlet;
   a thermochromic element fluidly coupled to the outlet of the mixing valve so as to receive the water mixture therefrom, the thermochromic element being configured to change from a first color to a second color in response to the water mixture reaching a predetermined transition temperature, the thermochromic element comprising a conduit having a wall with reduced-thickness wall areas;
   a shower head fluidly coupled to the first diverter valve outlet; and
   a return conduit fluidly coupling the second diverter valve outlet to one of the cold water source and the hot water source.

2. The shower system of claim 1, wherein the thermochromic element is located upstream from the diverter valve.

3. The shower system of claim 1, wherein the thermochromic element is located downstream from the second diverter valve outlet.

4. The shower system of claim 1, wherein the reduced thickness wall areas are configured as internal grooves defined between internal ribs or lands.

5. A water-conserving system for a water dispensing device, the system comprising:
   a mixing valve having a first mixing valve inlet configured to be fluidly coupled to a hot water source, a second mixing valve inlet configured to be fluidly coupled to a cold water source, and a mixing valve outlet, the mixing valve being operable to direct hot water from the first mixing valve inlet and cold water from the second mixing valve inlet to the mixing valve outlet in variable proportions;
   a diverter valve downstream from the mixing valve and having an inlet fluidly coupled to the mixing valve outlet, the diverter valve having a first diverter valve outlet configured to be coupled to the water dispensing device and a second diverter valve outlet, the diverter valve being operable to direct water received from the mixing valve outlet selectively to one of the first diverter valve outlet and the second diverter valve outlet;
   a thermochromic element fluidly coupled to the mixing valve outlet so as to receive the water mixture therefrom, the thermochromic element being configured to change from a first color to a second color in response to the water mixture reaching a predetermined transition temperature, the thermochromic element comprising a conduit having a wall with reduced-thickness wall areas; and
   a return conduit configured to fluidly couple the second diverter valve outlet to one of the cold water source and the hot water source.

6. The system of claim 5, wherein the return conduit is configured to fluidly couple the second diverter valve outlet to the cold water source.

7. The system of claim 5, wherein the thermochromic element is located upstream from the diverter valve.

8. The system of claim 5, wherein the thermochromic element is located downstream from the second diverter valve outlet.

9. The system of claim 5, wherein the reduced thickness wall areas are configured as internal grooves defined between internal ribs or lands.

10. A method of making a thermochromic element, comprising:
    providing uncured liquid polyvinyl chloride (PVC) material in a liquid state;
    mixing into the uncured liquid PVC material a thermochromic pigment in a concentration sufficient to provide a thermochromic change in the PVC from a first color to a second color in response to a predetermined transition temperature;

forming the PVC material with the mixed thermochromic pigment into a configuration of a thermochromic element; and curing the PVC with the mixed thermochromic pigment.

11. The method of claim 10, wherein the step of forming the PVC material with the mixed thermochromic pigment includes the step of forming the PVC material with the mixed thermochromic pigment into a conduit having a wall with reduced thickness wall areas.

12. The method of claim 11, wherein the reduced thickness wall areas are configured as internal grooves formed between internal ribs or lands.

13. A thermochromic fitting for providing a visual indication of a predetermined temperature having been achieved by a fluid flowing through the fitting, the thermochromic fitting comprising a conduit having an inlet and an outlet, the conduit comprising a PVC material with a thermochromic pigment that provides a change in color of the PVC material from a first color to a second color in response to achievement of the predetermined temperature by the fluid, wherein the conduit has a wall having an internal configuration defining a first wall thickness and second wall thickness that is less than the first wall thickness, whereby the change in color in response to the predetermined temperature is more rapid where the internal configuration defines the second wall thickness than where the internal configuration defines the first wall thickness.

14. The thermochromic fitting of claim 13, wherein the internal configuration comprises alternating lands and grooves, the lands defining the first wall thickness and the grooves defining the second wall thickness.

15. The thermochromic fitting of claim 14, wherein the lands and grooves extend axially along an inner wall of the conduit.

16. The thermochromic fitting of claim 14, wherein the lands and grooves are helical.

\* \* \* \* \*